AUTOMATIC PIPE CUTTING APPARATUS

Filed Feb. 21, 1964 3 Sheets-Sheet 1

INVENTOR.
Michio Hiratsuka
Yoichi Tanaka
BY
Mestern & Mestern

INVENTOR.
Michio Hiratsuka
Yoichi Tanaka

BY

Masteru & Masteru

AUTOMATIC PIPE CUTTING APPARATUS

Filed Feb. 21, 1964 3 Sheets-Sheet 3

INVENTOR.
Michio Hiratsuka
Yoichi Tanaka
BY
Mestern & Mestern

United States Patent Office 3,362,699

Patented Jan. 9, 1968

3,362,699

AUTOMATIC PIPE CUTTING APPARATUS

Michio Hiratsuka and Yoichi Tanaka, Yukuhashi-shi, Japan, assignors to Kabushiki Kaisha Yaskawa Denki Seisakusho, Kitakyushu-shi, Japan, a joint-stock company of Japan Filed Feb. 21, 1964, Ser. No. 346,422
Claims priority, application Japan, Feb. 23, 1963, 38/9,300
2 Claims. (Cl. 266—23)

This invention relates to a pipe cutting apparatus and more particularly to a pipe cutting apparatus for accurately and automatically working or cutting the ends of a branch pipe or an opening for joining a branch pipe in the configuration of the joint portion so as to ensure positive welding between pipes to be joined in the case of branching off a branch pipe from a pipe line such, for example, as a stress member of a building of pipe structure or a pipe line for liquid transport.

In order to join a branch pipe to a pipe there will be required a cutting operation for cutting off an end of the branch pipe in the configuration of the joint line and another cutting operation for making an opening on the side of the pipe to which a branch pipe is to be joined in the configuration of the joint line.

Heretofore, in a pipe cutting apparatus for such operations, the rotation of the pipe and the movement of a gas torch were jointly controlled by means of a complicated crank arm, resulting in such drawbacks as complicated setting procedures to meet various conditions, as well as the possibility of errors due to mechanical joints.

An object of this invention is to provide a supporting device for supporting and rotating a pipe to be subjected to cutting operations and a cutter which moves on the center line of the pipe side along the axial line of the pipe, wherein an electrical operation is performed so that the position of said cutter can move along the joint line corresponding to the rotation of said pipe so as to effect automatic control by means of said electrical operational output.

The features of the invention which are believed to be novel are set forth with particularity in the appended claims. The invention itself, however, as to principle together with organization and advantages thereof may best be understood by reference to the following description taken in connection with the accompanying drawings, in which the like parts or members are designated by like reference characters, and in which:

Figure 1:
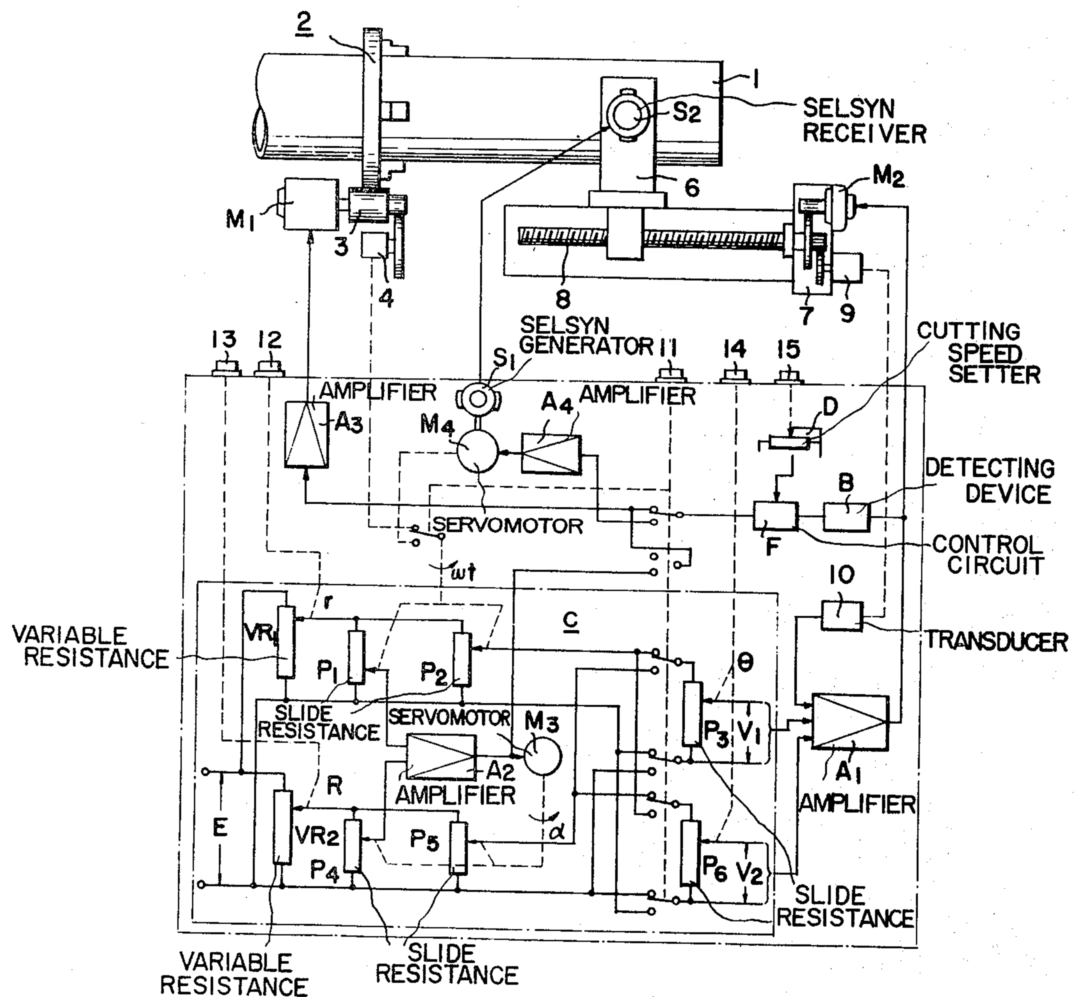
FIG. 1 is a schematic diagram showing an embodiment of this invention.

As shown in FIG. 1, a pipe 1 to be worked is supported by a chuck of a supporting means 2 and is caused to rotate by a motor $M_1$ through a gear 3. A detecting means 4 is provided for detecting the rotational angle $\omega t$ of the pipe 1 (where $\omega$ is the angular velocity of the pipe and $t$ is the rotating time; although it is actually $$\int_0^t \omega dt$$

it is represented herein by $\omega t$). At the side of the pipe 1 there is provided a cutting means, such as, for example, a gas torch or a cutter 5 (refer FIG. 3) which is supported by a supporting means 6, which is caused to move in the axial direction of the pipe 1 by a servo-motor $M_2$ through a gear mechanism 7 and a feed screw 8 with which the portion of the supporting means 6 is engaged. A detecting means 9 is provided to detect the position of the cutting means 5, while a transducing means 10 is provided for electrically transducing the detected value of the said detecting means 9. An operation circuit C performs electrical operation according to said rotation angle $\omega t$, the radius $r$ of the pipe 1 to be worked, the radius R of the pipe to be joined with said pipe 1, and the complementary angle $\theta$ of the joint angle between said pipe 1 and said pipe to be joined thereto. An amplifier $A_1$ is provided to control the servo-motor $M_2$ in accordance with the output voltage of the said operation circuit C and the output voltage from the transducing means 10. There are also provided a knob 11 for switching either to the cutting off of a pipe end or to the opening of a pipe, a knob 12 for setting the radius $r$ of a branch pipe, a knob 13 for setting the radius R of a pipe to which a branch pipe is to be joined, a knob 14 for setting the complementary angle $\theta$ of the joining angle, and a knob 15 for setting the cutting speed, together with amplifiers $A_2$, $A_3$, and $A_4$, servo-motors $M_3$ and $M_4$, and a cutting speed setter D.

Figure 4:
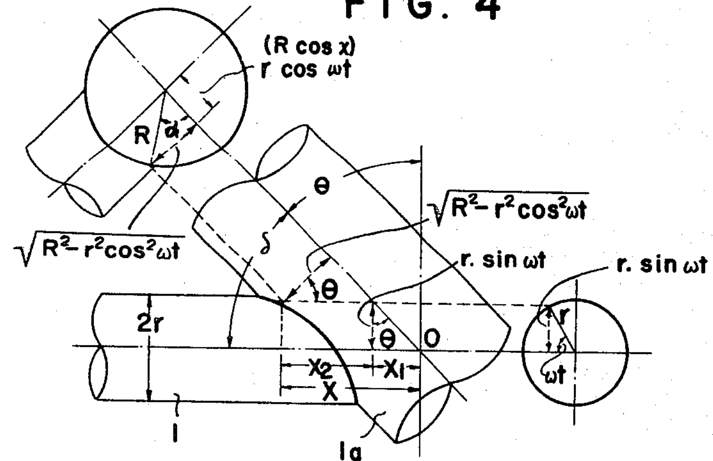
FIG. 4 is an illustration of a cutting-off line in the case of joining a pipe to another pipe of larger diameter.

First, as shown in FIG. 4 a case wherein a pipe $1_a$ with a radius of R is joined to another pipe 1 with a radius of $r$ (where $R \geqq r$) at a joint angle $\delta$ will be explained. In this case, it is necessary that the pipe 1 to be worked having a radius of $r$ be cut off along the joint line thereof into the form indicated by a thick line in the drawing. Therefore, the amount $x$ of displacement of the cutter 5 from a point 0 with the rotational angle of the pipe 1 at $\omega t$ can be represented by the following equation:

$$X = x_1 + x_2$$
$$= r \tan \theta \cdot \sin \omega t + \frac{1}{\cos \theta} \sqrt{R^2 - r^2 \cos^2 \omega t} \quad (1)$$

Hence, when the knob 11 is set on its cut off side, and the sliding element of a potential divider $VR_1$ connected to a constant voltage E is set so as to correspond to the radius $r$, a voltage corresponding to the radius $r$ can be obtained as its output voltage. If the output voltage is added to a non-linear slide resistor $P_2$ whose resistance varies sinusoidally and the sliding element of said non-linear slide resistor $P_2$ is caused to vary according to the rotational angle $\omega t$ of the pipe 1 which can be detected by means of the detecting means 4, the output voltage will be in proportion to $r \sin \omega t$. Therefore, by impressing this output voltage to a non-linear slide resistor $P_3$ whose resistance varies sinusoidally and the sliding element of the said non-linear slide resistor $P_3$ is set by a knob 14 in accordance with the complementary angle $\theta$ of the joint angle $\delta$, the terminal voltage $V_1$ thereof will be in proportion to $$r \sin \omega t \tan \theta \quad (2)$$

When the sliding element of another potential divider $VR_2$ connected to the constant voltage E is set by a knob 13 according to the radius R of the other pipe $1_a$, the output voltage is added to a non-linear slide resistor $P_5$ whose resistance varies sinusoidally, and the sliding element of said resistor is caused to rotate by means of the servomotor $M_3$, an output voltage proportional to $R \sin \alpha$ can be obtained according to the rotation angle $\alpha$ of said servomotor $M_3$. When this output voltage is impressed on a non-linear slide resistor $P_6$ whose resistance varies sinusoidally and the sliding element thereof is set according to the complementary angle $\theta$ of the joint angle, the output voltage $V_2$ obtained is $$R \sin \alpha \cdot \frac{1}{\cos \theta} \qquad (3)$$

Further, when the output of a potential divider $VR_1$, by which a voltage corresponding to the radius $r$ of the pipe 1 is obtained, is added to a non-linear slide resistor $P_1$ whose resistance varies consinusoidally, and the sliding element of said resistor $P_1$ is caused to vary together with the sliding element of the slide resistor $P_2$ according to the rotational angle $\omega t$ of the pipe 1, the output voltage of the non-linear slide resistor $P_1$ will be in proportion to $r \cos \omega t$. Also, when the output voltage of the potential divider $VR_2$, said voltage corresponding to the radius R of the pipe $\mathbf{1_a}$, is added to a non-linear slide resistance $P_4$ whose resistance varies consinusoidally, and the sliding element of said resistor $P_4$ is caused to rotate together with the sliding element of the slide resistor $P_5$ by means of the servomotor $M_3$, an output voltage proportional to $R \cos \alpha$ is obtained according to the rotational angle $\alpha$ thereof. When the difference voltage between the output voltage $R \cos \alpha$ of the non-linear slide resistor $P_4$ and the output voltage $r \cos \omega t$ of the non-linear slide resistor $P_1$ is amplified by the amplifier $A_2$, thereby driving the servomotor $M_3$ and controlling the position of the sliding elements of the non-linear slide resistor $P_4$ and $P_5$ so that said difference voltage becomes 0, there will be always established the following relationship provided that the responsive characteristic of the servomotor $M_3$ is sufficiently good.

$$R \cos \alpha = r \cos \omega t$$

Therefore, the output voltage $R \sin \alpha$ of the non-linear slide resistor $P_5$ which is interlocked with the non-linear slide resistor $P_4$ can be expressed by $$R \sin \alpha = \sqrt{R^2 - R^2 \cos^2 \alpha} = \sqrt{R^2 - r^2 \cos^2 \omega t}$$

Hence, the output voltage $V_2$ expressed by the Equation 3 can be written as follows;

$$\frac{1}{\cos \theta} \cdot \sqrt{R^2 - r^2 \cos^2 \omega t} \qquad (4)$$

Therefore, when the output voltage $V_2$ of the non-linear slide resistance $P_3$ as indicated by Equation 2 and the output voltage $V_2$ of the non-linear slide resistance $P_6$ as indicated by Equation 4 are combined, $$r \tan \theta \cdot \sin \omega t + \frac{1}{\cos \theta} \cdot \sqrt{R^2 - r^2 \cos^2 \omega t}$$

is obtained, thereby making it possible to obtain an operational output that coincides with the value of X in Equation 1.

Thus, the function of the rotational angle $\alpha$ of one of the pipes is set corresponding to the function of the rotational angle $\omega t$ of the other pipe by an electrical servo-circuit, and the required joint line is converted into a function of a distance in the axial direction which corresponds to the rotational angle of the pipe to be worked by means of an electric operational mechanism provided with said circuit and including the diameters of each of said pipes and the joint angle as the operational factors. Then it becomes possible to control the position of the cutter 5 through an amplifier $A_1$ by the difference between the output voltage of the operational mechanism which is a combination of said electrical elements and the output voltage of the converting means 10 which is produced in accordance with the actual position of the cutter detected by the detecting means 9, whereby the position of the cutter 5 can be caused to coincide with Equation 1 so as to cause it to travel along the required joint line as shown in FIG. 4, thus accomplishing cutting in the manner desired.

The non-linear slide resistor $P_3$ whose resistance varies sinusoidally can be so arranged that the output voltage is increased by $K_1$ times by winding sparsely or densely the resistance windings in such a manner that each resistance value for a displacement angle $\theta$ with respect to the total resistance value Z becomes, for example:

$$Z \cdot \tan \theta \cdot \frac{1}{K_1}$$

(where $K_1$ is a constant)

The above constant $K_1$ may be selected depending upon the ratio of the value of output voltage at the maximum displacement angle $\theta$ established to the output voltage at an angle of 45°.

Furthermore, a nonlinear slide resistance $P_6$ whose resistance value varies as a secant function can be obtained, for example, by obtaining a coefficient $K_2$ which corresponds to the resistance value at the required maximum displacement angle, making one part $Z/K_2$ of the total resistance value Z a fixed resistance and the other part variable by means of a sliding element, and winding the resistor with varying density so that the resistance value for each displacement angle $\theta$ becomes, $$Z = \cdot \sec \theta \cdot \frac{1}{K_2}$$

thus amplifying the output voltage by $K_2$ times.

Figure 5:
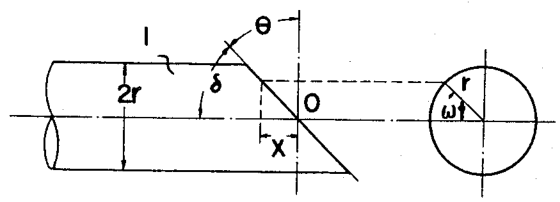
FIG. 5 is an illustration of a cutting-off line in the case of joining a pipe to a flat plane.

In the case of joining a pipe 1 which is to be a branch pipe to a flat surface with an appropriate joint angle $\delta$, it is necessary that the joint line of the pipe that is to be a branch pipe be formed as shown by a thick line in FIG. 5. Therefore, the displacement X of the cutter 5, with the rotational angle of the pipe 1 at $\omega t$, from the point O can be expressed by $$X = r \cdot \sin \omega t \tan \theta \qquad (5)$$

where $r$ is the radius of the pipe 1 and $\theta$ is the complementary angle of the joint angle $\delta$. That is, the pipe 1 can be cut off as shown in FIG. 5 by controlling the position of the cutter 5 according to an output value which can be obtained by operating the given radius $r$ of the pipe, the complementary angle $\theta$ of the joint angle $\delta$, and the rotation angle $\omega t$ of the pipe which is obtainable from the detecting means 4 so as to cause coincidence with the above Equation 5.

As described in the explanation for Equation 2, the output voltage $V_1$ of the non-linear slide resistor $P_3$ coincides with the value of Equation 5. Therefore, the operational circuit in the case of cutting off the end of a pipe to be joined to a flat surface can be composed of only the potential divider $VR_1$ and the non-linear slide resistors $P_2$ and $P_3$. Moreover, in the embodiment shown in FIG. 1, it may be assumed that the radius R of the pipe $\mathbf{1_a}$ to be joined to the pipe 1 has become infinitely great. Hence, when the set value of the knob 13 is at 0, the output voltage $V_2$ of the non-linear slide resistor $P_6$ becomes 0, whereby the necessary operational output can be obtained.

Next, the work of opening a joint hole to be provided on a pipe which is to be joined to a branch pipe will be explained.

Figure 6:
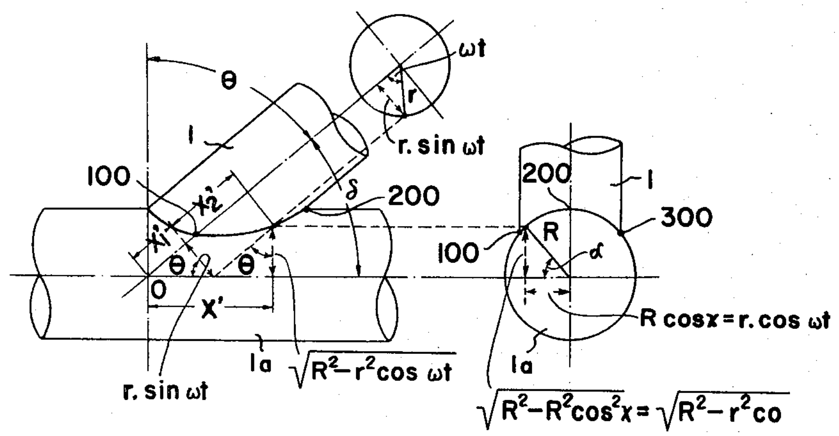
FIG. 6 is an illustration of an opening cutting line in the case of joining a pipe to a pipe of small diameter.

Referring to FIG. 6, when a pipe $\mathbf{1_a}$ having a radius R is to be joined to a branch pipe 1 having a radius $r$, it is necessary to cause the pipe $\mathbf{1_a}$ to be opened and cut off on the side thereof along the joint line as shown by a thick line in the drawing. Therefore, the displacement X' of the cutter 5 from the point O, with the rotation angle of the pipe 1 at $\omega t$, will be $$X^1 = \frac{1}{\sin \theta} x'_1 + \sin \theta x'_2$$

$$= r \frac{1}{\cos \theta} \sin \omega t + \tan \theta \sqrt{R^2 - r^2 \cos \omega t} \qquad (6)$$

wherein: $R \cos \alpha = r \cos \omega t$

Therefore, when connections of the non-linear slide resistors $P_3$ and $P_6$ in the operational circuit C are changed by switching the knob 11 to the opening side, the servomotor $M_4$ is driven by the cutting speed setter D through the amplifier $A_4$ as a result of said switching of the knob 11, whereby the sliding elements of the non-linear slide resistors $P_1$ and $P_2$ are caused by the resulting rotation angle $\omega t$ to vary. As explained before, since a condition expressed by $$R \cos \alpha = r \cos \omega t$$

has been satisfied by an electrical automatic servo-circuit comprising the amplifier $A_2$ and servomotor $M_3$. The output voltage of the potential divider $VR_1$ is a voltage corresponding to $r$, the output voltage of the nonlinear resistor $P_1$ is impressed into the amplifier $A_2$ as the input corresponding to $r \cos \omega t$, and the output voltage of the nonlinear resistor $P_2$ corresponds to $r \sin \omega t$. The last-mentioned voltage (of the resistor $P_2$) is impressed into the nonlinear resistor $P_6$ by switching the knob 11, whereby the output voltage of the nonlinear resistor $P_6$ the voltage of which is $V_2$ becomes $$r \sin \omega t \frac{1}{\cos \theta}$$

On the other hand, the output voltage of the potential divider $VR_2$ is a voltage corresponding to R, the output voltage of the nonlinear resistor $P_4$ is impressed into the amplifier $A_2$ as the input corresponding to $R \cos \alpha$, and servo-operation is carried out so that the difference between the said input $R \cos \alpha$ and the aforementioned input $r \cos \omega t$ may become a minimum, whereby the output voltage of the nonlinear resistor $P_5$ becomes the value represented by $R \sin \alpha$, that is, $$R \sin \alpha = \sqrt{R_1 - \cos^2 \alpha} = \sqrt{R^2 - R^2 \cos^2 \alpha}$$
$$= \sqrt{R^2 - r^2 \cos^2 \omega t}$$

This voltage is impressed into the nonlinear resistor $P_3$ by switching over the knob 11, whereby the output voltage of the nonlinear resistor $P_3$ the voltage of which is $V_1$ becomes $$\sqrt{R^2 - r^2 \cos^2 \omega t - \tan \theta}$$

By combining said output voltages $V_2$ and $V_1$, an operational output which coincides with Equation 6 can be obtained. By means of this operational output, the moving position of the cutter 5 can be controlled, and necessary opening and cutting can be obtained.

In this case, the reason why the nonlinear resistors $P_1$ and $P_2$ are made to slide by means of the motor $M_4$ is as follows:

Between the radii R and $r$ of the respective pipes 1*a* and 1, the following relation always necessarily is established $$R \geqq r \text{ and } R \cos \alpha = r \cos \omega t$$

In the case of cutting the pipe, as in the embodiment of FIG. 4, the rotation itself of pipe 1 held by the chuck 2 has been obtained directly as the rotational angle $\omega t$, but when the pipe $1_a$ in FIG. 6 is held by the chuck 2 it is impossible to obtain the rotational angle $\omega t$ of the pipe 1 which abuts upon the pipe $1_a$ (which is worked so as to be perforated) from the chuck 2 because of the fact that in the cast of the cutting aperture of the pipe $1_a$, a power is not the rotational angle $\omega t$ of the pipe 1. Consequently, in the case of the cutting aperture of the pipe $1_a$, a power source for affording the rotational angle $\omega t$ of the pipe 1 is necessary. For this purpose, a motor $M_4$ is provided. That is, it is only necessary to adjust the sliding elements of the nonlinear resistor $P_1$ and $P_2$ according to the rotational angle $\omega t$ of the pipe 1 by means of said motor $M_4$. When this rotational angle $\omega t$ exceeds $2\pi$, similar pursuit of the locus of the aperture of the cut pipe is done as will be clearly understood from the Equation 6. In this case, what motion occurs in the pipe $1_a$ held by the chuck 2. The manner of this motion will be described as follows.

When $\omega t = 0$, then $\cos \omega t = 1$, and the relation $R \cos \alpha = r$ is established. Consequently, let it be assumed that the relative position point 100 corresponding to the relation $$\left(\alpha = \cos^{-1} \frac{r}{R}\right)$$

is a starting point of rotation of the pipe $1_a$. In this case, in the course of clockwise rotation of the pipe $1_a$, when the relation $(\omega t = \pi/2)$ is established, the relation $(r \cos \omega t = 0 = R \cos \alpha)$ is obtained and the position corresponding to this relation becomes a point 200. With further increase of $\omega t$, the relation $(\omega t = \pi)$ is established and the relation $(\cos \omega t = 1)$ is established. The position corresponding to said last relation corresponds to the point 300. After the above rotation of the pipe $1_a$, when the angle $\omega t$ becomes $\omega t \geqq \pi - 2\pi$, the pipe $1_a$ is reversely rotated counterclockwise in the sequence corresponding to the points 300→200→100, whereby the pipe $1_a$ is restored to the position corresponding to the point 100.

In this case, the pipe 1 carries out one rotation corresponding to $(\omega t = 0 - 2\pi)$, so that it is intended to afford the angular displacement corresponding to the rotation of the pipe 1 by means of the motor $M_4$. The motor $M_3$ is made to operate, in accordance with the angular displacement $\omega t$ given from the motor $M_4$, so as to carry out electric servo-operation corresponding to the relation $$R \cos \alpha = r \cos \omega t$$

whereby the motors $M_1$ and $M_2$ are driven so that the Equation 6 may be satisfied.

The explanation on joint lines illustrated in FIGS. 4, 5, and 6 describes the examples of joint lines cut and formed according to this invention. For example, in the case of joining a pipe 1 with a pipe $1_a$, with some displacement from the center of the pipe $1_a$, it is possible, of course, to accomplish the cutting into a required shape by analyzing the joint line and composing an operational circuit corresponding thereto so that the joint line can be obtained as the combination of electrical elements. This can be accomplished, for example, by adding a voltage corresponding to the displacement value to the output voltage of the non-linear slide resistor $P_4$.

In the case of joint welding of pipes, in order to form padding in the welds, it is necessary to provide beveling either on the cut end of the pipe 1 which is to be the branch pipe or the cut surface of the opening of the pipe $1_a$ to which the branch pipe is to be attached.

Figure 2:
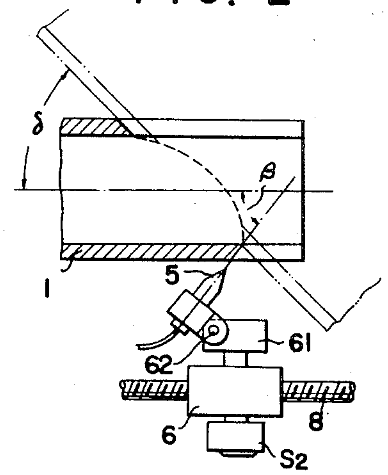
FIG. 2 is a top view showing the cutter portion of the apparatus of the invention in the case of cutting off a pipe end.
Figure 3:
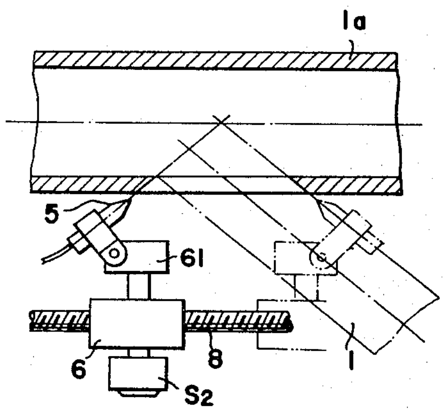
FIG. 3 is a top view showing the cutter portion in the case of cutting a pipe opening.

For this purpose, as shown in FIGS. 2 and 3, the cutter 5 is so adapted that the fitting angle thereof is made adjustable by a pivot 62 on a supporting arm 61 which is mounted on the supporting means 6. The supporting arm 61 is caused to rotate synchronously with the rotational angle $\omega t$ of the servomotor $M_4$ by both a selsyn transmitter $S_1$ which generates a voltage related to the rotational angle $\omega t$ of the servomotor $M_4$ and a selsyn receiver $S_2$ which receives the said voltage. Therefore, when the cutter 5 is directed in the direction of the cutting portion of the pipe and the fitting angle $\beta$ with respect to the axial line of the pipe is fixed equal to the joint angle $\delta$, in case of cutting off the pipe to be worked, the direction of the cutter is not changed due to the lack of instruction from the selsyn transmitter, thereby enabling beveling to be made as required as shown in FIG. 2 over the entire periphery of the cutting surface due to the rotation of the pipe 1, whereas in the case of cutting an opening, the cutting direction of the cutter 5 with respect to the pipe axis varies in conical form according to the rotation of the pipe $1_a$, thereby enabling beveling as shown in FIG. 3 to be obtained automatically, simultaneously with the cutting.

Figure 7:
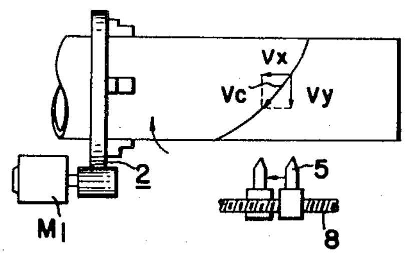
FIG. 7 is a schematic view illustrating the cutting speed.

In the foregoing explanation, the rotational speed of the pipe, that is to say, of the motor $M_1$ or servomotor $M_4$, was explained as being caused to be a constant speed by the cutting speed setter D. In such a case, the actual speed of the cutter 5 is considered to be the vector resultant value of the peripheral speed $Vy$ of the pipe 1 and the moving speed $Vx$ of the cutter as shown in FIG. 7. Hence, the cutting speed is liable to fluctuate greatly as a result of change in the cutting shape, with the possibility of unevenness in cutting.

As a countermeasure, it is possible to maintain the actual cutting speed of the cutter 5 always at a constant rate by providing a detecting means B for detecting the moving speed $Vx$ of the cutter 5 and by applying the output voltage thereof and the cutting speed setting voltage $Vc$ established by a cutting speed setter D to a control circuit F, thereby extracting the output voltage of $Vc^2-Vx^2$ and using it to rotate the motor $M_1$ or the servomotor $M_4$ so as to reduce the rotational speed of the pipe when the moving speed $Vx$ of the cutter increases.

Thus, according to this invention, in cutting and working pipes along their joint line, said pipes to be joined at an appropriate joint angle, a supporting means for supporting the pipe to be cut and worked and for rotating the same and a cutter which moves on the center line of the side of the pipe along the axial line of the pipe are provided, and an electrical control means is provided so as to cause the cutter to move on the joint line by the output of an electrical operational mechanism having an electrical automatic servo-circuit which includes the radius of each pipe and the joint angle as the operational factors, and which sets the function of the rotating angle of one of the pipes in accordance with the function of the rotational angle of the other pipe thereby causing the joint line to be converted to the function of the distance in the axial direction corresponding to the rotational angle of the pipe to be worked. Therefore, accurate cutting can be accomplished by automatically controlling the position of the cutter by setting necessary operational factors in accordance with the shape of the joint line of the pipes. Furthermore, according to this invention, since the control is carried out by means of a purely electrical servo-operational mechanism, setting operation becomes very easy and control errors becomes few in addition to simplicity of structure, without requiring levers or the like as operational means.

Since it is obvious that many changes and modifications can be made in the above described details without departing from the nature and spirit of the invention, it is to be understood that the invention is not to be limited to the details described herein except as set forth in the appended claims.

What is claimed is:

1. An automatic pipe cutting apparatus wherein pipes to be joined are cut along the joint line thereof, comprising a supporting means for supporting and rotating a pipe to be cut and worked, a cutting means supported at an appropriate angle with respect to said pipe, an electrical operational mechanism adapted to move said cutting means along a path parallel to the axis of said pipe on the side center line thereof, means to convert radii ($r$, R) of said two pipes to be joined into respective electrical quantities, an electrical servo-operational device to establish a relation, that is the electrical quantity representing the radius ($r$) of one pipe × cosine of the rotational angle ($\omega t$) of said pipe
= electrical quantity representing the radius (R) of the other pipe × cosine of the rotational angle ($\alpha$) of said other pipe, an amplifier circuit ($A_1$) to calculate an equation of the electric quantity representing the radius ($r$) of one pipe × a trigonometrical function of the rotational angle ($\omega t$) of said on pipe +
the electrical quantity representing the radius (R) of said other pipe X trigonometrical function of the rotational angle ($\alpha$) of said other pipe × trigonometrical function of an angle ($\theta$) between said two pipes and mean energized by the output from said amplifier circuit ($A_1$) to cut and work said pipes.

2. An automatic pipe cutting apparatus wherein pipes to be joined are cut along the joint line thereof, comprising a supporting means for supporting and rotating a pipe to be cut and worked, a cutting means supported at an appropriate angle with respect to said pipe, an electrical operational mechanism adapted to move said cutting means along a path parallel to the axis of said pipe on the side center line thereof, means to convert radii ($r$, R) of said two pipes to be joined into respective electrical quantities, an electrical servo-operational device to establish a relation, that is the electrical quantity representing the radius ($r$) of one pipe × sine of the rotational angle ($\omega t$) of said pipe
= electrical quantity representing the radius (R) of the other pipe × sine of the rotational angle ($\alpha$) of said other pipe, an amplifier circuit ($A_1$) to calculate an equation of the electric quantity representing the radius ($r$) of one pipe × a trigonometrical function of the rotational angle ($\omega t$) of said one pipe +
the electrical quantity representing the radius (R) of said other pipe X trigonometrical function of the rotational angle ($\alpha$) of said other pipe × trigonometrical function of an angle ($\theta$) between said two pipes and means energized by the output from said amplifier circuit ($A_1$) to cut and work said pipes.

References Cited

UNITED STATES PATENTS

| 1,963,537 | 6/1934 | Tweit | 266—230 |
|---|---|---|---|
| 2,974,415 | 3/1961 | Werner | 266—230 |

JOHN F. CAMPBELL, *Primary Examiner.*

M. L. FAIGUS, *Assistant Examiner.*